Nov. 16, 1954     C. C. HAAS     2,694,356

FURROW OPENER MOUNTING

Filed March 1, 1951

Inventor:
Clarence C. Haas
By: Paul O. Pippel
Attorney.

United States Patent Office 2,694,356
Patented Nov. 16, 1954

2,694,356

FURROW OPENER MOUNTING

Clarence C. Haas, Richmond, Ind., assignor to International Harvester Company, a corporation of New Jersey Application March 1, 1951, Serial No. 213,353

5 Claims. (Cl. 97—245)

This invention relates to agricultural implements and particularly to a planter furrow opener. More specifically, the invention concerns the mechanism by which a furrow opener is mounted upon a traveling support.

In a trail-behind planter such as that with which this invention is particularly concerned, a great many dispensing and furrow opening mechanisms are incorporated in a limited space. The planter furrow opener is lifted generally about a pivot point ahead of the furrow opener and the rear portion of the unit is lifted higher than the forward end thereof. Since the lifting space is limited, sufficient clearance is not normally provided for the furrow opener above the ground in its transport position. An object of the present invention, therefore, is to provide in a planter, supporting and lifting mechanism for the ground working unit which will increase the clearance of the furrow opener above the ground in transport position.

Another object of the invention is to provide in supporting and lifting mechanism for the ground working unit of a planter, improved mechanism connecting the tool to the planter frame adapted to maintain the furrow opening units substantially level during up-and-down motion in ground working position, said mechanism also functioning to maintain the earth working units substantially level as they rise to transport position.

Other objects and advantages of the invention will become clear from the following detailed description when read in conjunction with the accompanying drawings wherein.

Figure 1:
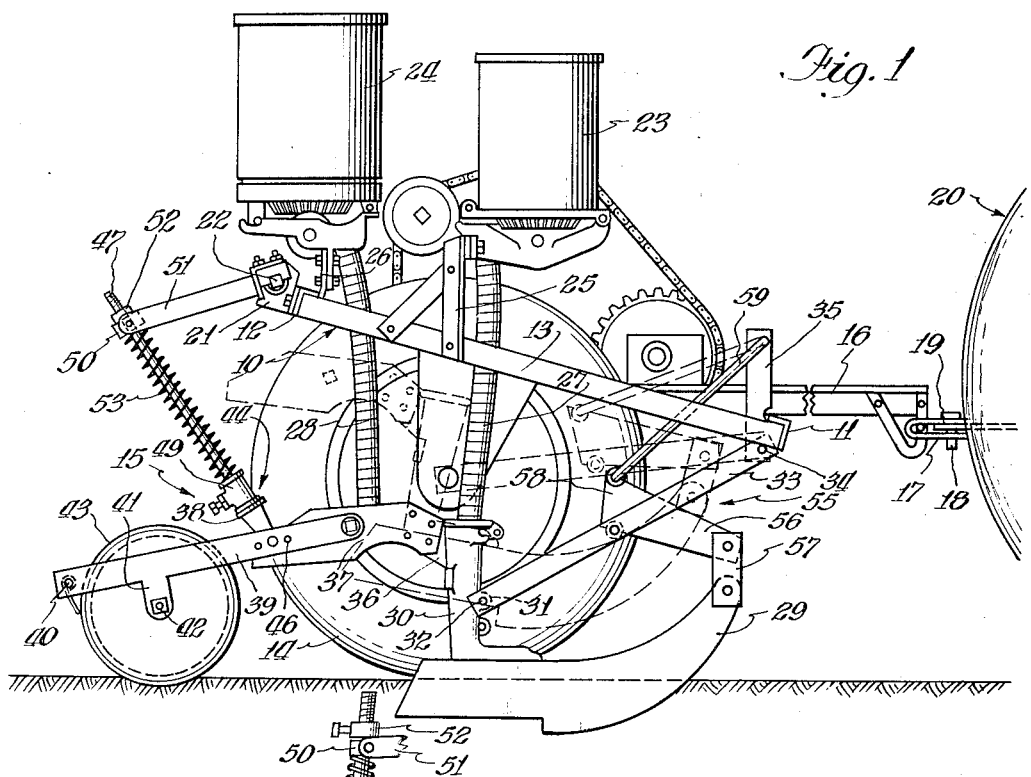
Figure 1 is a view in side elevation of a trail behind planter connected to a tractor to be drawn thereby and embodying the features of this invention.

Referring to the drawings, the planter comprises generally a transversely extending rectangular frame 10 comprising forward and rearward parallel angle bars 11 and 12, respectively, and end bars 13, only one of which is shown. The frame 10 is supported upon one or more ground wheels 14 and is adapted for the mounting thereupon of a plurality of planting units at laterally spaced locations along the frame, only one such unit being shown and designated by the numeral 15. Also carried by the frame 10 is a forwardly extending hitch structure 16 which is pivotally connected by a clevis 17 to a vertically extending pin 18 carried by the draw bar 19 of a tractor 20.

The structure of the framework 10 is conventional and requires no elaboration. It may be noted, however, that the rear frame bar 12 supports at laterally spaced locations therealong a plurality of brackets 21, only one of which is shown and which support for rocking movement a shaft 22. Shaft 22 functions as the lifting rock shaft for lifting and lowering the earth working tools in a manner to be hereinafter set forth. It may likewise be observed that a seed dispenser 23 and a fertilizer dispenser 24 are provided for each earth working unit 15 for depositing material in the furrow formed thereby and are respectively mounted upon brackets 25 and 26 affixed to and projecting upwardly from the planter frame. Flexible seed and fertilizer tubes 27 and 28 direct material from the respective containers 23 and 24 to the ground.

Figure 2:
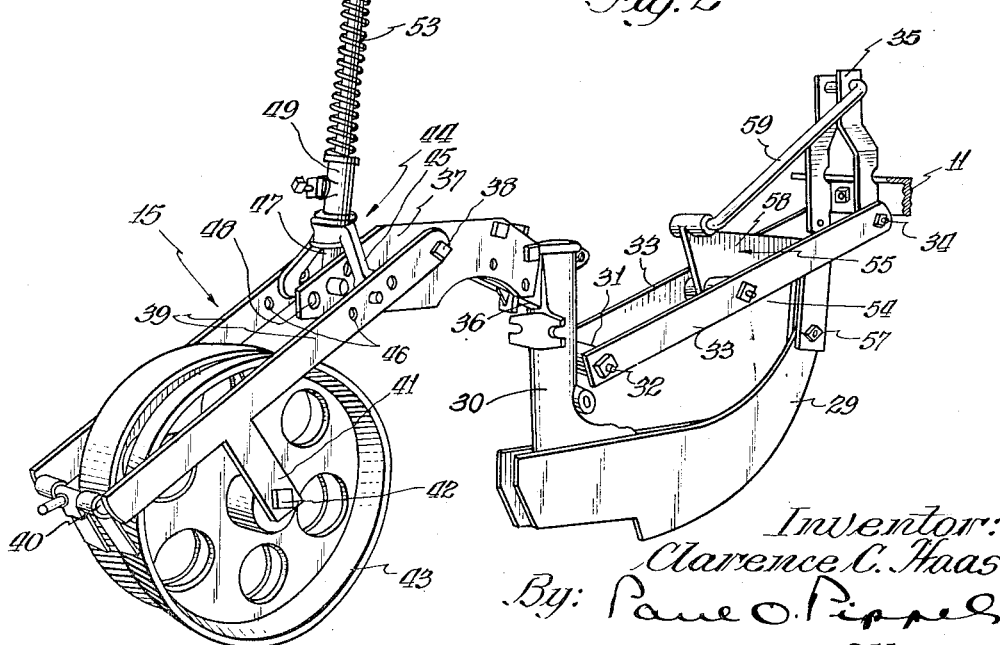
Figure 2 is a perspective view of the ground working unit.

The earth working unit 15 comprises an elongated longitudinally extending planter furrow opener of the runner type designated by the numeral 29, the forward end of which curves upwardly and the rear end of which is bifurcated as indicated in Fig. 2 to receive the seed boot 30, to which is connected the seed tube 27 for delivering seed at the rear of the runner 29 into the furrow formed thereby.

Seed boot 30 serves as a supporting standard having a forwardly extending lug 31 thereon to which is pivotally connected by a pin 32 the rear end of a pair of laterally spaced forwardly and upwardly extending drag bars 33, the forward ends of which are pivoted at 34 upon the lower end of a bracket 35 which is bolted to and extends vertically upwardly from the front angle bar 11. The furrow opener is thus connected to the planter frame for vertical movement with links 33 about the pivot 34 on the frame and can be adjustd laterally to vary the row spacing.

Projecting rearwardly from the upper end of the boot 30 is another lug 36 to which is secured a plate 37 supporting a transverse pivot bolt 38 upon which is pivotally mounted at opposite sides of the plate 37 a pair of laterally spaced carrier bars 39, the rear ends of which are connected by a transverse member 40. Each of the bars 39 is provided with a depending lug 41 carrying a bolt 42 upon which is mounted a press wheel 43.

The entire earth working unit 15 is raised and lowered by mechanism which includes a member 44 having legs 45 bent outwardly at their lower ends and pivotally receivable in one or more openings 46 provided in the arms 39. Member 44 is apertured to receive the lower end of an upwardly extending rod 47 for sliding movement. The lower end of the rod 47 is bent for pivotal reception in one or more openings 48 provided in the plate 37. A collar 49 is adjustable on the lower end of the rod 47, and the upper end of the rod is slidable in a swivel 50 pivotally mounted at the end of a rock arm 51 affixed to the transverse rock shaft 22. Another collar 52 is provided at the upper end of the rod 47 to prevent displacement of the rod from the swivel 50. A spring 53 surrounds the rod between the swivel 50 and the collar 49 and serves to urge the member 44 and therefore the press wheel 43 downwardly into contact with the ground. It will likewise be noted that the press wheel 43 and the carrier bars 39 are movable about the pivot 38 with respect to the plate 37.

At this point it will be observed that lifting of the earth working unit 15 is accomplished by rocking the shaft 22 which is connected through the arm 51 and rod 47 with the earth working unit to lift it generally in an arc about the pivot 34 of the links 33 on the frame. Drag bars or links 33 transmit draft from the frame to the earth working tools and rise and fall therewith in the normal operation of the implement in the ground. In the solid line position shown in Fig. 1, the runner 29 is penetrating the ground to form a furrow for the deposition of seed and fertilizer, and the press wheel 43 is in position to pack the earth turned up by the furrow opener and to cover the seed. It is desirable that the maximum lift be imparted to the earth working tools and particularly the planter runner 29 when the implement is raised to transport position so that the runner will clear the ground sufficiently to avoid injury thereto. It is also important, as pointed out before, that in operating position the runner floats with the contour of the ground and remains substantially level in working position as well as when raised to transport. To accomplish this purpose the drag bars 33 have mounted therebetween and midway thereof a transversely extending pivot bolt 54 upon which, between the bars 33, is fulcrumed a bell crank 55, one arm 56 of which is pivotally connected to one end of a pair of links 57, the other ends of which are pivotally connected to the forward end of the runner 29. The other arm 58 of the bell crank is pivotally connected to the rear end of a link or thrust rod 59, the forward end of which is pivotally connected to the upper end of the bracket 35. Upon forward movement of the furrow opener 29 with respect to the planter frame about the axis 34, the bell crank 55 likewise swings in an arc in the opposite direction, link 59 serving as a thrust rod to rock the bell crank 55 in a counter-clockwise direction as viewed in Figure 1. This movement of the bell-crank offsets the effect of the arcuate movement of bars 33 about the pivot 34 in a clockwise direction and maintains the entire earth working unit substantially level as it rises and falls and as it moves upwardly to the dotted line position indicated in Figure 1.

It is believed that the invention should be clearly understood from the foregoing description. It should likewise be clear from the foregoing that a novel planter furrow opener supporting mechanism has been devised which forces the earth working units to remain substantially level with the ground upon vertical movement thereof. It should also be understood that the invention has been described in its preferred embodiment and that modifications may be made therein without departing from the spirit of the invention or the scope of the appended claims.

What is claimed is:

1. The combination with a wheel supported implement frame, of a longitudinally extending runner, a draft connection for the runner comprising a longitudinally extending drag link pivotally connected to the rear end of the runner and to the frame on horizontal transverse axes, a horizontal transverse rock shaft on the frame having a connection therebetween and the runner for lifting the latter upon rocking the shaft to move the runner upwardly in an arcuate path about the pivot of the drag link on the frame, a rockable member mounted on said drag link medially of the pivots of said drag link for rotation on a horizontal transverse axis, said member including an arm having an end pivotally connected to the forward end of the runner, and a link vertically spaced from the forward portion of the drag link extending from the rockable member to the frame and pivotally connected at one end to the frame and at its other end to said rockable member and reacting against the frame for rocking the rockable member to move the forward end of the runner upwardly about the pivot of the runner on said drag link upon movement of the runner vertically about the pivot of the drag link on the frame.

2. The combination with a wheel supported implement frame, of a longitudinally extending planter runner having a seed boot at its rear end for guiding seed to the furrow formed by the runner, a draft connection for the runner comprising a longitudinally extending drag link pivotally connected to said boot and to the implement frame above the runner on horizontal transverse axes, a horizontal transverse rock shaft on the frame and a connection therebetween and the runner for lifting the latter upon rocking the shaft to move the runner upwardly in an arcuate path about the pivot of the drag link on the frame, a bell crank pivotally mounted on said drag link medially of the pivots of said drag link for rotation on a horizontal transverse axis, means pivotally connecting an arm of the bell crank to the forward end of said runner, and a second link extending above the forward portion of said drag link, said second link being pivotally connected to the frame and to the other arm of said bell crank and reacting against the frame for rocking the bell crank to move the forward end of the runner upwardly about the pivot of the runner on said drag link upon vertical movement of the runner about the pivot of the drag link on the frame, whereby the runner is maintained substantially parallel to the ground.

3. The combination with a wheel supported implement frame, of a longitudinally extending planter furrow opener, a draft connection for the furrow opener comprising a longitudinally extending drag link pivotally connected at its rear end to the rear end of the furrow opener and at its forward end to the frame on horizontal transverse axes, lifting mechanism on the frame connected to the furrow opener for raising and lowering the latter about the pivot axis of said drag link on the frame, a bell crank pivotally mounted on the drag link on a horizontal transverse axis between the pivots of said drag link near the pivot axis of the drag link on the frame, a connection between the bell crank and the forward end of the furrow opener for rocking the furrow opener about its pivot on the drag link in response to rocking movement of the bell crank, and a connection between the frame and the bell crank and reacting against the frame operative to rock the bell crank and the furrow opener in an angular direction opposite to that of the drag link about its pivot on the frame upon raising and lowering of the furrow opener.

4. The combination with a wheel supported implement frame, a longitudinally extending earth penetrating tool disposed substantially parallel to the ground, a standard supporting the tool, a draft connection for the tool comprising a longitudinally extending drag link pivotally connected on horizontal transverse axes between said standard and the frame accommodating vertical floating movement of the tool in an angular direction about the pivot of said drag link on the frame, a bell crank pivotally mounted on said drag link on a horizontal axis between the pivots of the drag link, said bell crank having an upper arm extending above and a lower arm extending below said drag link, a pivotal connection between said tool and the lower arm of said bell crank for rocking the tool about its pivot on the drag link in response to rocking movement of the bell crank, and a connection between the frame and the upper arm of the bell crank reacting against the frame and operative to rock the bell crank and the tool in an angular direction opposite to the angular direction of movement of the drag link about its pivot on the frame.

5. The combination with a wheel supported implement frame, of a longitudinally extending earth penetrating tool disposed substantially parallel to the ground, a standard supporting the tool, a draft connection for the tool comprising a longitudinally extending drag link pivotally connected on horizontal transverse axes between said standard and the frame accommodating vertical floating movement of the tool in an angular path about the pivot of said drag link on the frame, a bell crank pivotally mounted on said drag link on a horizontal axis between the pivots of the drag link, said bell crank having an upper arm extending above and a lower arm extending below said drag link, a pivotal connection between said tool and the lower arm of said bell crank, and a thrust member pivotally connected to the frame and to the upper arm of the bell crank reacting against the frame and operative to maintain the tool substantially parallel to the ground during vertical movement thereof.

References Cited in the file of this patent

UNITED STATES PATENTS

| Number | Name | Date |
|---|---|---|
| 966,662 | Danielson | Aug. 9, 1910 |
| 1,308,163 | Burgess | July 1, 1919 |
| 1,312,281 | Springer | Aug. 5, 1919 |
| 1,960,268 | Kriegbaum et al. | May 29, 1934 |
| 2,012,853 | Heitshu | Aug. 27, 1935 |
| 2,031,640 | Garaldson | Feb. 25, 1936 |
| 2,111,453 | Lange | Mar. 15, 1938 |

FOREIGN PATENTS

| Number | Country | Date |
|---|---|---|
| 456,211 | Germany | Feb. 17, 1928 |
| 841,106 | France | Feb. 1, 1939 |